United States Patent [19]
Napor et al.

[11] 3,761,806
[45] Sept. 25, 1973

[54] AUTOMATIC CAPACITOR INSPECTION MACHINE

[75] Inventors: Carl A. Napor, Glen Ridge; Jaime Lehman, Irvington; Anthony A. Milana, Toms River, all of N.J.

[73] Assignee: Kahle Engineering Co., Union City, N.J.

[22] Filed: May 24, 1972

[21] Appl. No.: 256,422

[52] U.S. Cl............. 324/60 C, 209/81 R, 324/73 AT
[51] Int. Cl....................... G01r 11/52, G01r 27/26
[58] Field of Search............ 324/60 C, 60 R, 73 AT; 209/81 R, 74 M

[56] References Cited
UNITED STATES PATENTS

| | | | |
|---|---|---|---|
| 2,016,455 | 10/1935 | Purdy | 324/60 R X |
| 2,419,484 | 4/1947 | Danzinger | 324/60 R X |
| 2,567,741 | 9/1951 | Smith | 209/81 R |
| 2,591,047 | 4/1952 | Burge et al. | 324/73 AT |
| 2,707,356 | 5/1955 | Bayha | 324/73 AT |

*Primary Examiner*—Stanley T. Krawczewicz
*Attorney*—Alexander C. Wilkie, Jr.

[57] ABSTRACT

An automatic machine for inspecting electric capacitors is disclosed. The machine includes a rotating turret having a number of capacitor supports which carry the capacitors through a series of automatic test stations. The stations automatically determine a number of characteristics of one or more sections of the capacitors such as voltage retention, terminal to cover insulation value and capacity. The machine marks and rejects capacitors which do not meet preset voltage retention, insulation, and capacity values and also separates acceptable capacitors into a number of separate differently coded groups according to their particular capacitance value range.

20 Claims, 10 Drawing Figures

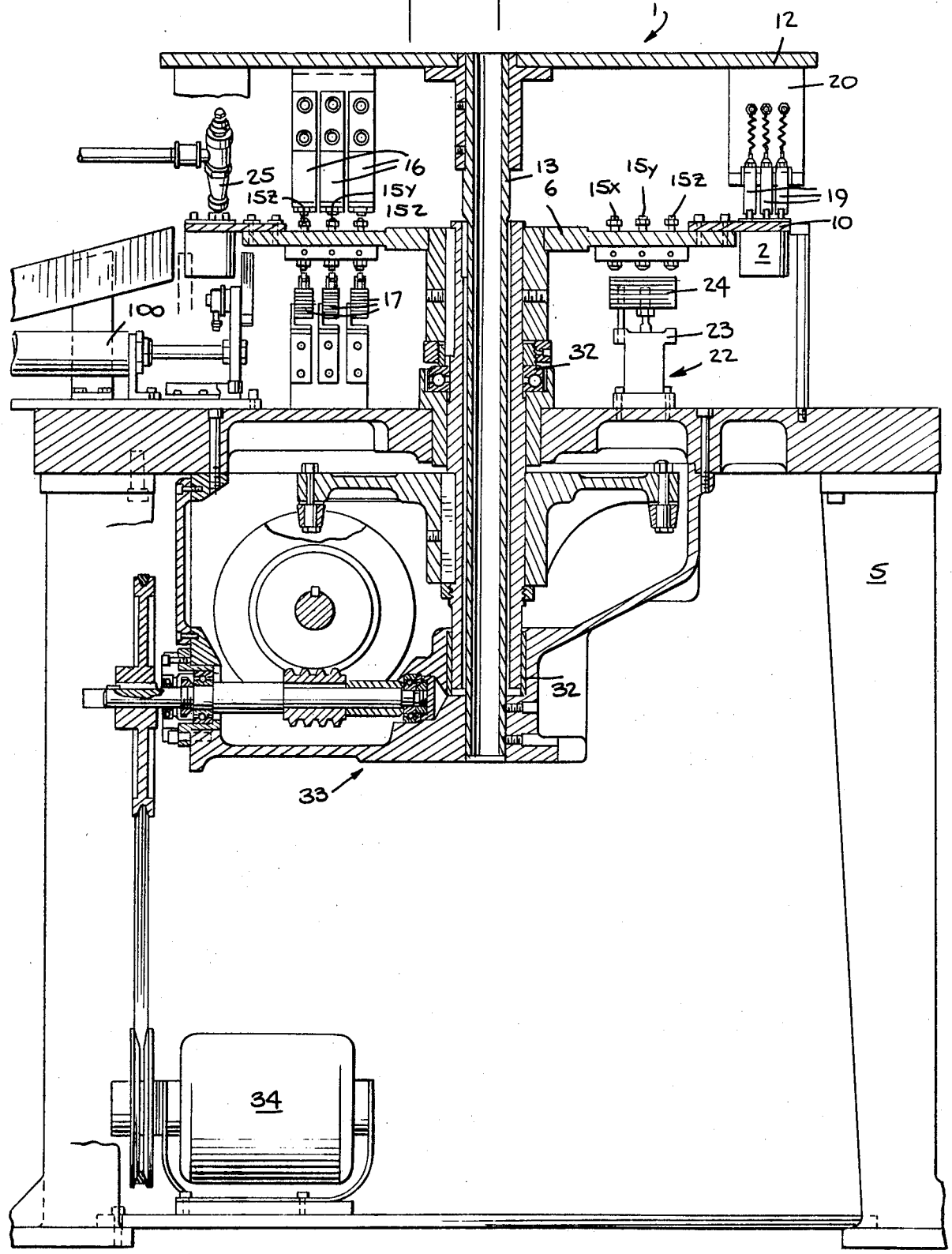

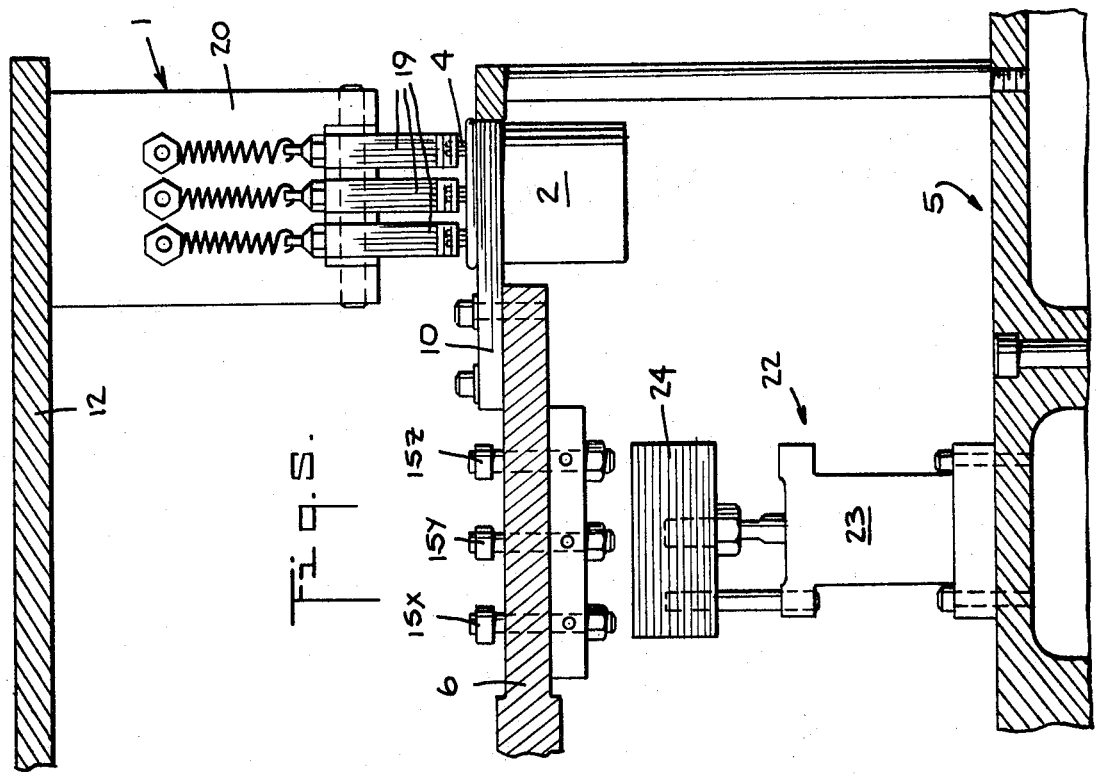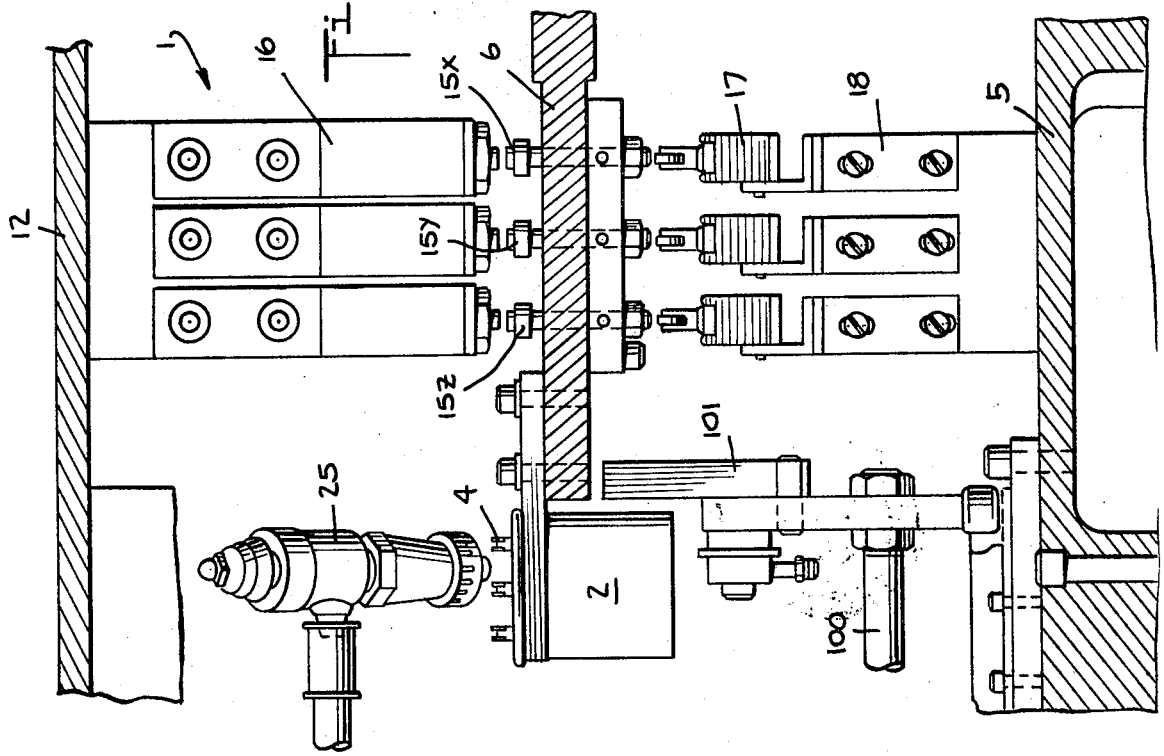

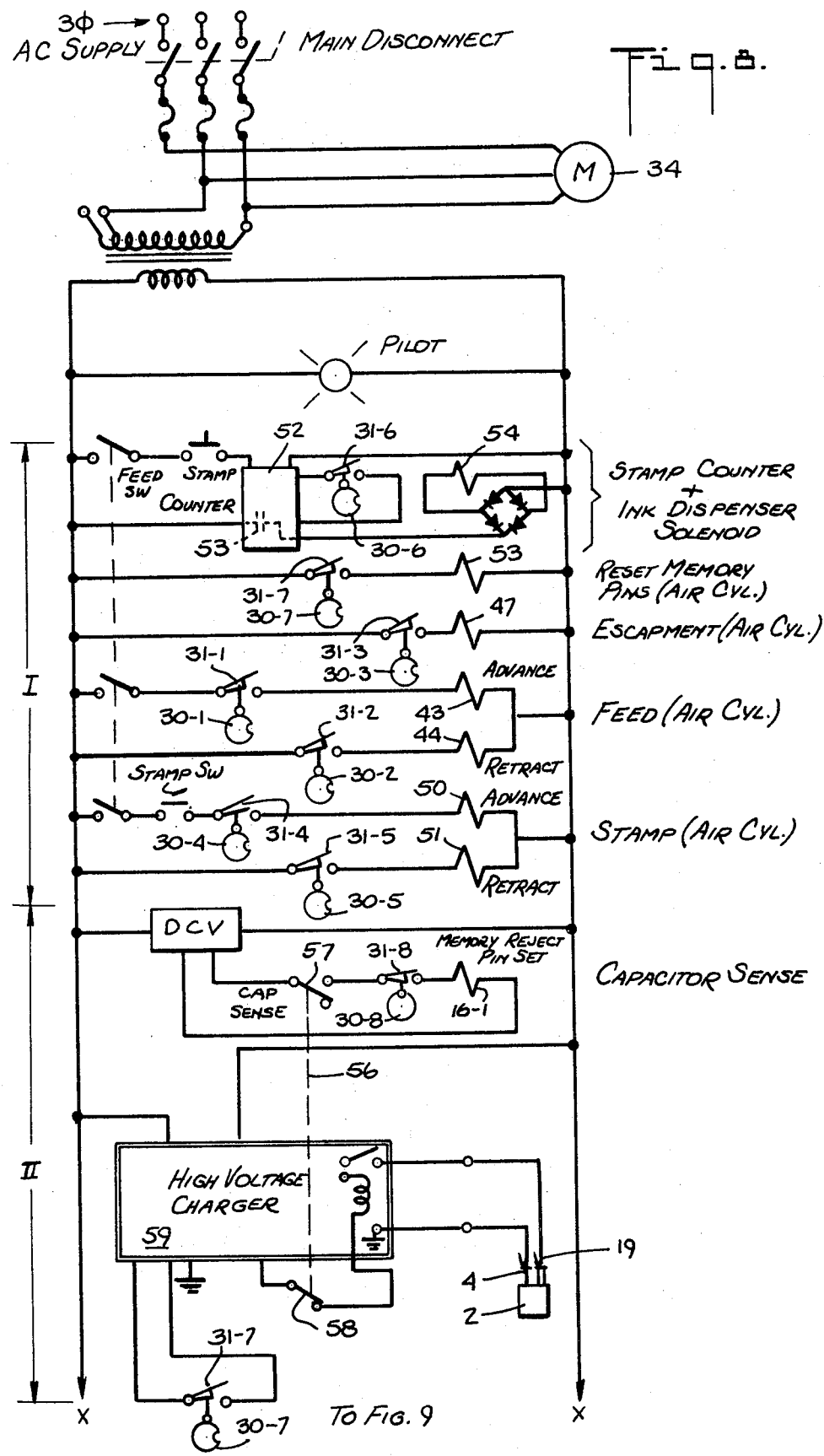

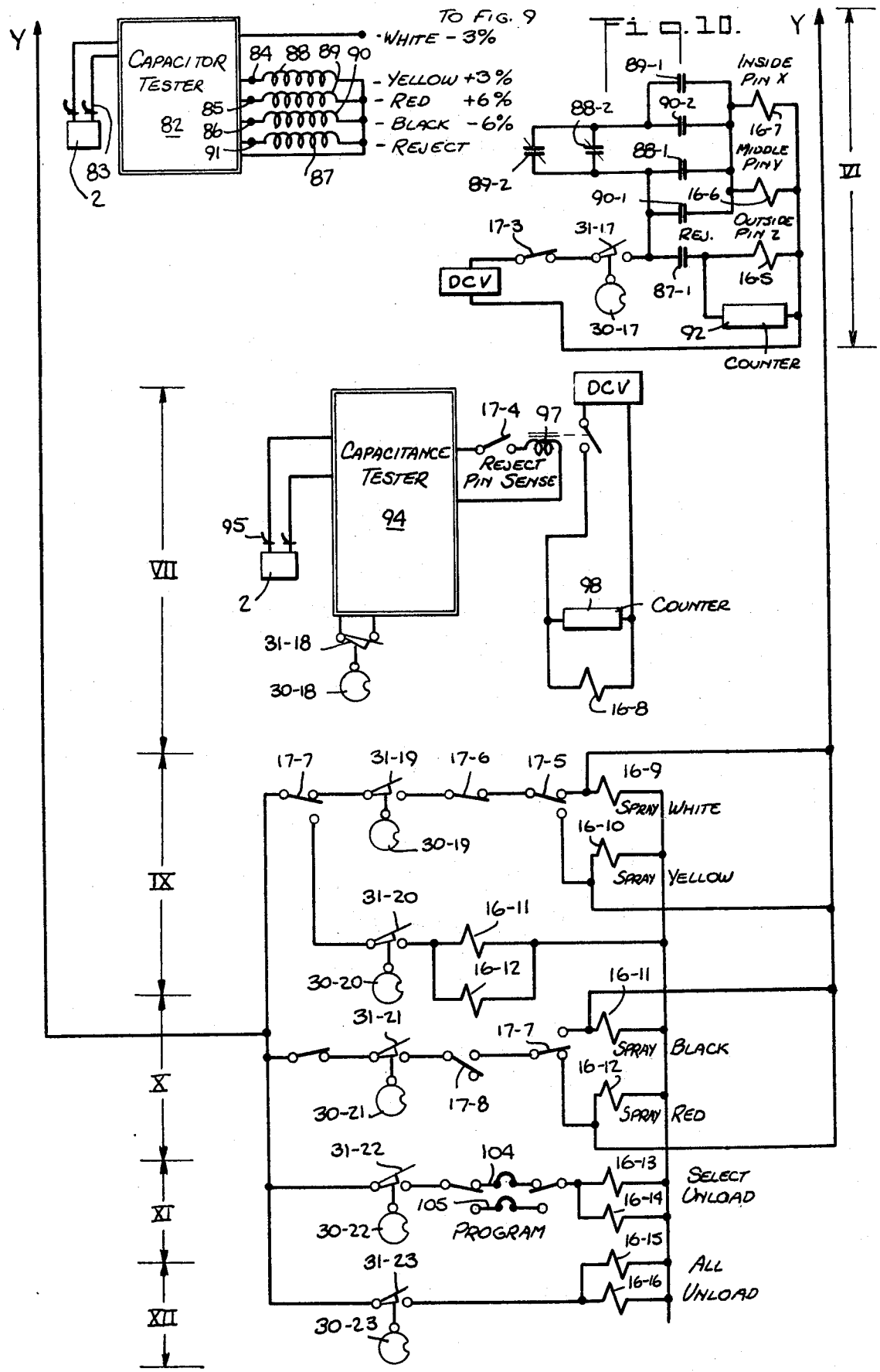

AUTOMATIC CAPACITOR INSPECTION MACHINE

BACKGROUND OF THE INVENTION

The present invention relates to high speed automatic test machinery for inspecting electric capacitors and more particularly to test equipment capable of carrying out a number of variable tests and of then selectively coding and dividing the tested capacitors with differing faults or differing measured capacitance values for being fed out at different output stations.

Capacitors are now manufactured at high speed on automatic machinery and the purpose of the present invention is to provide an automatic capacitor testing means capable of a correspondingly high speed automatic testing of each capacitor for a number of characteristics and for then both marking and for selectively unloading the tested capacitor in accordance with results of these tests. This automatic testing involves a reading of differing characteristics such as the testing of the capacitor dielectric strength or voltage retention and the capacitance values which must be changed in accordance with the particular type of capacitor being manufactured and tested.

At present, the needed variations in the tests required for changing capacitor types and values have resulted in all or a substantial portion of the tests being made manually by test personnel. This manual testing by inspectors not only is a slow operation but is also an operation which requires a substantial amount of handling and rehandling of the tested capacitors. It also makes the tests subject to human errors such as inevitably occur in a continuous and monotonous manual testing operation of the type required for such electrical components.

Accordingly, an object of the present invention is to provide an improved high speed test device for capacitors and the like.

Another object of the present invention is to provide an automatic capacitor inspection machine capable of providing a number of varying and adjustable tests.

Another object of the present invention is to provide an automatic capacitor inspection machine capable of testing capacitors for varying values and for both selectively marking and segregating the tested capacitors in accordance with the test results.

Another object of the present invention is to provide an automatic capacitor inspection machine capable of continuous, high speed, reliable and trouble-free operation.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings, forming a part of the specification, wherein:

FIG. 2 is a vertical sectional view of the inspection machine of FIG. 1.

FIG. 3 is a horizontal sectional view, partially cut away, illustrating the test stations.

FIG. 4 is an enlarged vertical sectional view of a color coding station.

FIGS. 8, 9 and 10 are schematic diagrams illustrating the control circuits at the several test stations.

DESCRIPTION OF THE PREFERRED EMBODIMENTS

The overall machine will first be generally described with reference to FIGS. 1 – 3.

Figure 6:
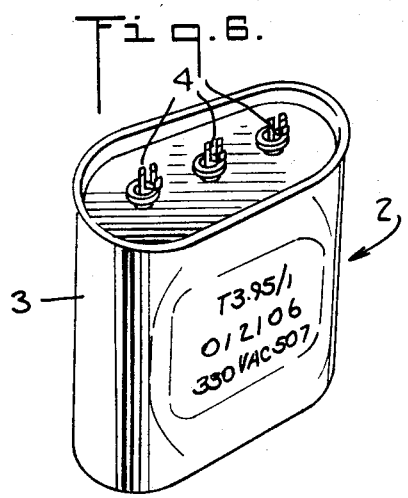
FIGS. 6 and 7 are perspective views of typical capacitors of the type tested in the inspection machine of the present invention.
Figure 7:
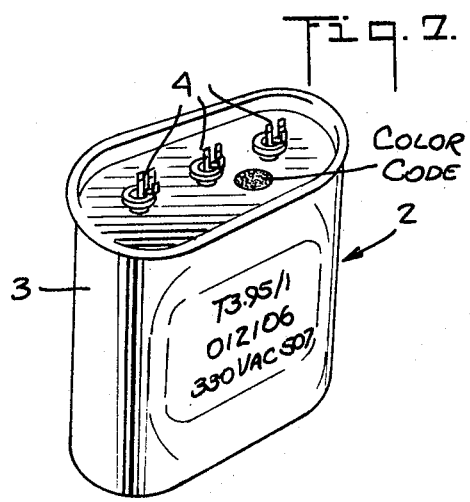

The capacitor inspection machine 1 of the present invention will be described for use in testing typical oil filled capacitors as illustrated at 2 in FIGS. 6 and 7. These capacitors have a metal casing 3 with a number of insulated terminals 4 projecting from the capacitor base. Other types of capacitors or similar electric components may also be tested.

The preferred embodiment of the test machine 1 has a table or bases which supports a rotatably mounted test turret 6. As best seen in FIG. 1, a line of capacitors 2 to be tested is fed towards the test turret 6 on a moving conveyor 7. A feed control 8 and stamping means 9 at the feed station I marks and feeds one capacitor 2 to one of several capacitor supports 10 on the turret 6. These supports 10 are seen to be mounted in spaced relation around the edge of the intermittently indexed turret 6. As the turret 6 is stepped or indexed, the capacitor supports 10 carry the capacitors 2 along a guide rail 11 successively past the test stations such as the twelve stations identified by numerals I – XII in FIG. 1. A number of differing and variable tests are performed at certain of these stations and other stations are provided for selective coding and off-loading operations. The testing, coding and selecting means provided at the various stations, which will be described more fully below, are partially mounted on the top of machine table 5 beneath the turret 6 and partially upon a stationary upper support 12 attached to a stationary center post 13 in the manner illustrated in FIG. 2.

The stations I through XII will first be generally described as to location and function and will then be more fully described under apropriate headings.

GENERAL DESCRIPTION OF THE TEST STATIONS

Figure 1:
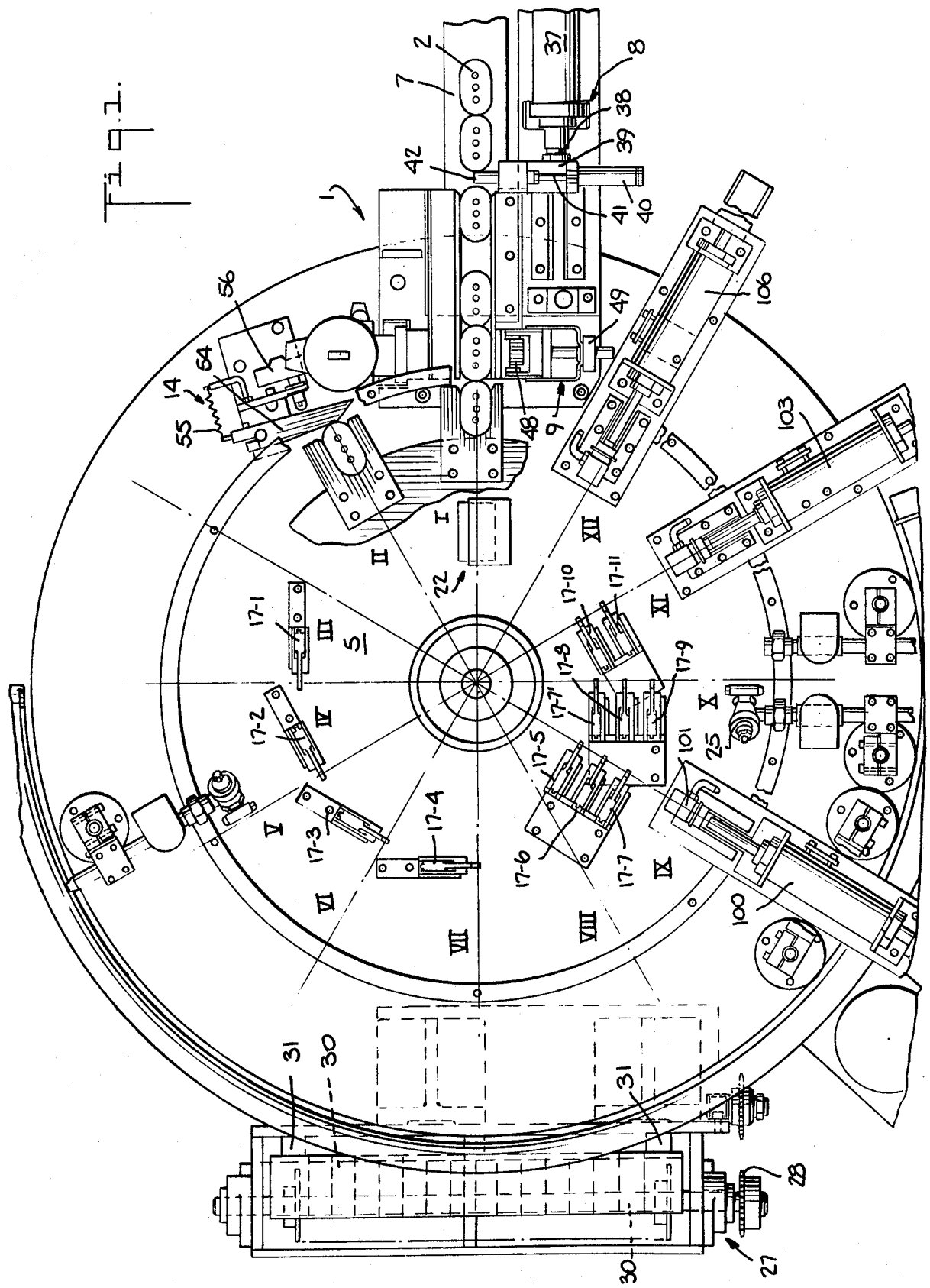
FIG. 1 is a top plan view partially in section of a preferred embodiment of the capacitor inspection machine.

At station I, as illustrated in FIG. 1, the capacitors 2 to be tested are fed into the machine 1 from the conveyor 7. This station I includes a feed control mechanism 8 and a stamping mechanism 9 which operate to control the feeding of the capacitors 2 into the cap supports 10 on the machine turret 6 and simultaneously to mark or code each capacitor.

At station II, a sensing means 14 determines whether or not a capacitor 2 is present in each cap support 10. If the cappcitor 2 is present, it is charged with a high voltage preparatory for the voltage or dielectric test at station III. If no capacitor 2 is present, a "no test" means is set to eliminate testing at succeeding stations.

At station III, the test voltages applied at station II are measured to determine whether a faulty capacitor has permitted excess voltage decay. A reject device is set for rejecting faulty capacitors.

At station IV, a second lower voltage test is made to double check the capacitors and to assure that the capacitors withstood the initial voltage test at station III.

At station V, an insulation test is performed between the capacitor terminals and the metal casing.

At station VI, a test is made of the capacitance value of one capacitor section, such as the main section of the capacitor being tested and readouts are made placing the value in one of four preselected ranges and providing a reject signal for capacitors outside all of the ranges.

At station VII, a second capacitance test is made for a second capacitor section and a reject signal is provided for faulty sections.

Station VIII is provided as an extra station for use where a particular capacitor may require an additional test.

At stations IX and X four color coding guns, two at each station, mark the capacitors with coding colors in accordance with the capacity measurements made at stations VI and VII. At station IX, a capacitor reject mechanism also removes all capacitors which have been detected at any of the prior stations as being faulty either in voltage retention, insulation value, or in capacitance values.

Station XI is a capacitor removal station which may be selectively set up for removing acceptable capacitors having certain capacitance values, i.e., capacitors having values within two of the four ranges selected at station XI may be removed at station XI.

Station XII removes all capacitors which have not been previously removed as, for example, capacitors in the other two ranges as selected at station VI.

In order to coordinate the various testing operations described briefly above, a memory system is provided on the turret 6 adjacent to each of the spaced capacitor supports 10. FIG. 4 illustrates this memory device which consists of a number of vertically movable memory pins 15. These pins 15 are moved between an inoperative or raised position and an operative or lowered position at the various stations by electric solenoids 16 mounted above the turret 6 on the upper holder 12. FIG. 4 illustrates three solenoids 16 positioned above three memory pins 15. When three memory pins are used in this manner, it is seen that the pins may assume eight different positions or different combinations of raised and lowered pins. These differing combinations of memory pin positions are used in the rejecting and in the capacitor marking operations in a manner to be further described below.

FIG. 4 also illustrates microswitches 17 mounted on suitable support brackets 18 beneath each of the memory pins 15. Similar switches are used at the various stations where it is desired to detect the position of one or more of the memory pins 15.

Figure 5:
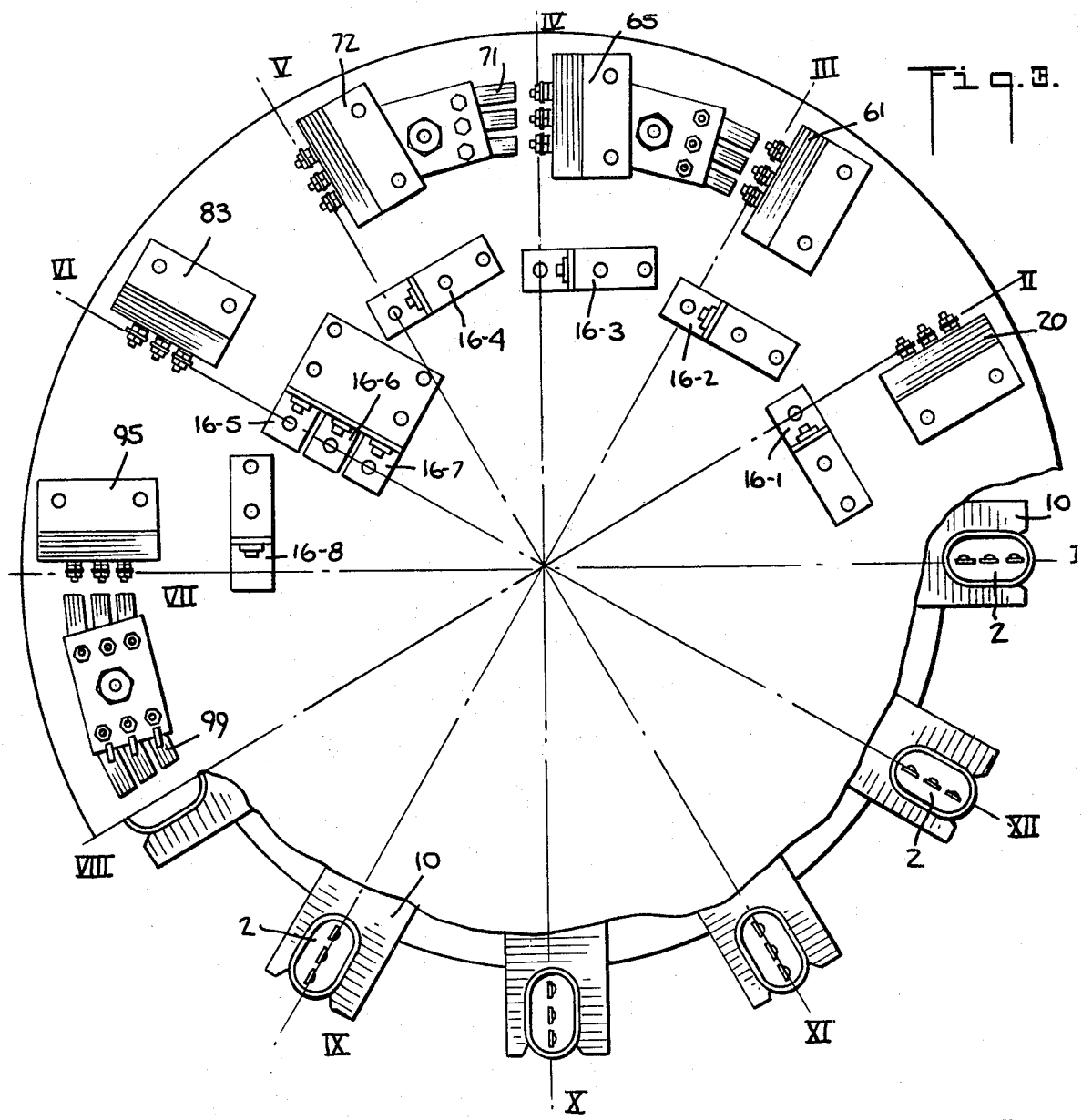
FIG. 5 is an enlarged vertical sectional view of the memory pin reset and capacitor discharge station.

In addition to the above described memory system, the various stations include means for either electrically charging or discharging or for taking test readings on the several capacitor terminals 4. FIG. 5 shows three copper or other resilient and conductive sensor leaves or contacts 19 engaging the terminals 4 of a capacitor 2 under test. These contacts 19 are mounted on suitable insulator supports 20 on the upper support 12 as required and are electrically coupled by electrical conductors to the various voltage sources or grounds or test terminals of the several test devices.

FIG. 5 also illustrates a reset device 22 with an air motor 23 and a piston 24 which is positioned at station I to reset or raise any of the lowered memory pins 15 before the newly loaded capacitor 2 is carried through its testing cycle on the turret 6.

As will also be discussed more fully below, one or more of the test stations may be used for providing a code marking on the capacitors 2 after they have been tested at stations VI and VII. If the test system, for example, is set up to distinguish capacitors having their measured capacities in four differing ranges above and below the desired reading, the memory pins 15 will be set at the test stations VI and VII to selectively activate four differently colored paint spray nozzles such as the nozzle illustrated at 25 in FIG. 4 to color code the capacitors 2.

In addition to the above elements which are used in various combinations at the several test stations, the testing operation utilizes a timing cam system 27 whose rotation is synchronized with the movement of the main test turret 6 by having its drive sprocket 28 coupled by a suitable drive chain (not shown) to the main turret drive motor system. A cam shaft 29 (FIG. 1) turns a number of timing cams 30 in synchronism with the turret movement, each of which opens and closes a timing switch 31 which will be referred to in the detailed description of the several test stations which follows.

The main test turret 6 as illustrated in FIG. 2, is rotatably mounted on base 5 on bearings 32 and is intermittently turned to carry the capacitors 2 from station to station by an indexing drive 33 driven by a continuously rotating drive motor 34 which is also coupled to the above described cam shaft 29.

CAPACITOR FEED STATION I

As illustrated in FIG. 1, the capacitors 2 are fed into the inspection machine 1 by a moving conveyor 7. The endmost capacitor 2 is moved from a stationary support plate 36 at the edge of the turret 6 into the cap support 10 by a tImed feed. This feed includes a main feed cylinder 37 whose piston 38 reciprocates in the direction of the capacitor feed. This piston 38 is coupled to a support slide 39 which mounts an escapement air cylinder 40 whose piston 41 is coupled to a capacitor feed bar 42. The timing control for the operation of the feed cylinder 37 and the escapement cylinder 40 is illustrated at the top of FIG. 8 in the portion labeled Station I. The feed cylinder control solenoids 43 and 44 for advancing and retracting its piston 38 are coupled through switches 31-1 and 31-2 operated by cams 30-1 and 30-2 mounted on the above described cam system 27. These switches 31-1 and 31-2 advance and retract the feed piston 38 at the proper time intervals. The escapement cylinder 40 which is moved back and forth by the feed cylinder 37 has its piston moved to its extended position by a control solenoid 47 operated by a switch 31-3 and cam 30-3 on the cam system 27 to advance and retract the capacitor feed bar 42 at the proper intervals to intermittently push the capacitors 2 forward toward the cap support 10.

Each capacitor 2 is preferably marked by a coding means 9 prior to its entry into the cap support 10. The coding stamp 48 is driven by an air cylinder 49 whose advance and retract solenoids 50 and 51 are similarly energized in a properly timed relationship by a pair of switches 31-4 and 31-5 and cams 30-4 and 30-5 in the cam control system 27.

FIG. 8 also illustrates a controlled inking system for the stamp 48. This system includes a counter 52 coupled to a switch 31-6 closed by a cam 30-6 in the cam system 27 so that it counts the number of capacitors 2 stamped. When this number reaches a predetermined value, the counter 52 control switch 53 couples a control solenoid 54 of an inking cylinder to a source of power causing an inking roller to be moved across the face of the stamp 48.

The control for the above described memory pin reset device 22-24 (FIG. 5) is shown in FIG. 8 including the control solenoid 53 for the air motor 22 operated through switch 31-7 and cam 30-7 in cam system 27.

CAPACITOR CHARGE STATION II

At station II, a capacitor sensing arm 54 (FIG. 1) of sensing means 14 is moved radially outwardly against the force of a coil spring 55 to open the capacitor sensing microswitch 56 contact 57 (FIG. 8) when a capacitor 2 is present in the capacitor support. A second contact 58 on this switch 56 simultaneously energizes the high voltage source 59 illustrated in FIG. 8 to apply the desired high test voltage through contacts 19 of the type illustrated in FIG. 5 at 19 to the capacitor 2 terminals 4. The voltage is applied to the terminals 4 under the control of a timing cam 30-7 and switch 31-7 in the cam system.

If there is no capacitor in the support 10 at station II, the contacts 57 (FIG. 8) remain closed so that memory solenoid 16-1 is energized under the control of timing switch 31-8 and cam 30-8 to lower memory reject pin 15-Z. The lowering of reject pin 15-Z is sensed at subsequent stations to cut off their test operations since no capacitor is present.

CAPACITOR VOLTAGE TEST STATION III

Figure 9:
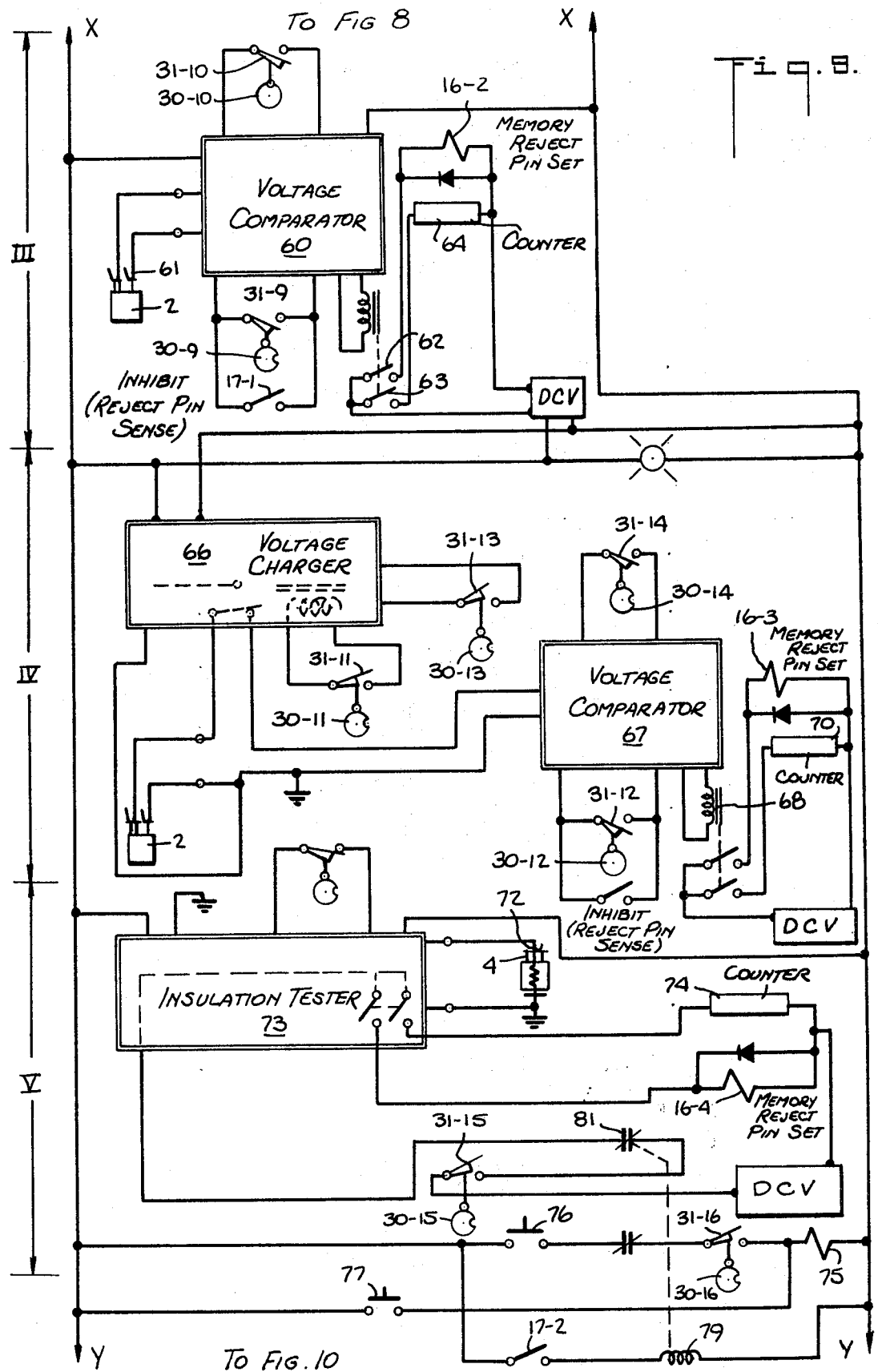

At station III, the voltage applied at station II is read by a voltage comparator as illustrated at 60 in FIG. 9. This comparator 60 is set to provide an output signal in the event the voltage in the capacitor section under test and coupled to the comparator 60 by contacts 61 is lower than a predetermined value. When this is the case, the comparator 60 closes output contacts 62 which energize a memory pin 15-Z activating solenoid 16-2 of the type illustrated at 16 in FIG. 4 to lower the reject pin 15-Z. When this reject pin has been lowered, a microswitch such as a switch 17 (FIG. 4) will be activated at the succeeding test stations to bypass the test operation and a switch 17 at reject station IX is activated to remove that capacitor 2 from the inspection machine.

A second contact 63 is operated by the comparator 60 to activate a counter 64 to record the number of faulty capacitors detected at this station.

The test measurement is made only when switch 31-9 is opened by control cam 30-9. If there is no capacitor in the support 10, reject pin 15Z which has been depressed at station II closes contact 17-1 to prevent a reading and a wrong count at counter 64.

Switch 31-10 on cam 30-10 resets the comparator 60 for the next cycle.

SECOND CAPACITOR VOLTAGE CHECK STATION IV

At station IV, a second voltage test is performed at a somewhat lower voltage to provide a second check and to insure that any capacitors which may have been damaged during the higher voltage check at station III are removed.

As the capacitors 2 are carried from the first voltage test station III to station IV, their terminals are grounded by a number of contacts 65 (FIG. 3) positioned between the stations to prepare the capacitors for the test at station IV.

At station IV, the terminals 4 are again engaged by a number of contacts 65. These contacts 65 are first coupled to a voltage source 66 by the operation of a switch 31-11 by cam 30-11 in the cam system 27. Thereafter the charged capacitor section is coupled to the test terminals of a second voltage comparator which is also set to provide an output signal where the tested voltages fall below a preset value. When this occurs, the comparator 67 output switches energizes a reject solenoid 68 whose contacts 69 depress the memory pin 15Z through solenoid 16-3 and operate counter 70, operate switches at subsequent test stations to bypass the test and to remove the faulty capacitors at the reject station IX as already described.

As at station III, the measurement on comparator 67 is made only when contact 31-12 is open and inhibit switch 17-2 when closed by reject pin 15Z prevents a miscount on counter 70.

Reset switches 31-13 and 31-14 operated by cams 30-13 and 30-14 reset the voltage source 66 and the voltmeter 67.

INSULATION TEST STATION V

As the turret 6 carries the capacitors 2 from station IV to station V, the capacitor terminals 4 engage a number of grounded contacts 71 (FIG. 3) to remove any voltage from the capacitor sections. At station V, all of the capacitor terminals are simultaneously engaged by contacts 72 coupled to an insulation tester 73. A timing cam 30-15 and switch 31-15 in the cam system 27 apply DC voltage to the reject pin solenoid 16-14 and counter 74 to provide a reject reading and count where the desired insulation values do not exist between the capacitor terminals 4 and the grounded metal capacitor 2 case. When a low insulation test reading occurs, the insulation tester 73 contacts close activating a solenoid 16-4 setting the regular memory reject pin 15Z and also operating a counter 74 to record the number of capacitors rejected at this station.

An additional operation is performed at station V which is an identification or coding operation. The circuit for this operation is shown at the bottom of FIG. 9. An operating solenoid 75 for a color gun is seen to be coupled between the voltage lines through a cam 30-16 and a timing switch 31-16 and a manual control switch 76. It may be desired, for example, to identify each capacitor 2 during a particular run. When this identification is desired, the switch 76 is closed causing a coloring gun similar to the gun 25 illustrated in FIG. 4 to mark each capacitor 2 as the timing switch 31-16 is closed. A manual switch 77 is also provided to flush and clean out the paint spray system when required.

If a capacitor is missing from the holder 10 or already rejected at an earlier station, the reject switch 17-2 will close opening relay 79 contacts 80 and 81 to prevent the insulation test and the coding operation thereby preventing false readings.

CAPACITANCE MEASURING STATION VI

Station VI includes a capacitance measuring instrument 82 of the type which is coupled to the capacitor at contacts 83 and which provides a number of reading outputs indicating which of a selected number of tolerance bands the capacitance of a section of a particular capacitor 2 may fall into. The capacitance tester 82, for example, has one output 91 which gives a reject signal if the capacity is above or below a certain capacity band and three outputs 84, 85 and 86 each of which may be adjusted for giving a selected reading indicating a capacitance zone within the band. A fourth band is indicated by no output at all. For example, the output 84 may register capacitors which are on the high side between 0 and 3 percent. A second output 85 may register capacitors on the high side between 3 and 6 percent. The additional output 86 may similarly register low readings between −3 and −6 percent. No reading would result for a range of from 0 to 3 percent. The above described outputs 83 − 86 are seen to each be connected to relay solenoids 87 − 90. At the right hand side of FIG. 10 for station VI, there is an illustration of a circuit operated by the contacts of the relay solenoids 87 − 90 for causing differing arrangements of the reject pins 15X, 15Y and 15Z in accordance with the capacitance readings and so that the capacitors may be selectively marked and unloaded by the pins at subsequent coloring and unloading stations IX through XII.

A reject signal through solenoid 87 closes contact 87–1 to activate the pin setting solenoid 16–5 for the reject memory pin 15Z and counter 92 when the timing cam 30–17 closes timing switch 31–17.

A signal on output 86 energizes solenoid 90 closing contacts 90–1 and 90–2 to simultaneously energize pin set solenoids 16–6 and 16–7 to lower both memory pins 15X and 15Y. The lowering of pins 15X and 15Y is the pin setting for a capacitor section reading between −3 and −6 percent and is designated a Black reading for the coding guns.

A signal on output 85 (+3 to +6 percent) energizes the (red) solenoid 89 to close contact 89–1 to lower only pin 15X through pin setting solenoid 16–7.

A signal on output 84 (0 to 3 percent) energizes the (yellow) solenoid 88 to lower only memory pin 15Y through solenoid 16–6.

There is no output for the 0 to −3 percent reading which is the white code and both pins 15X and 15Y remain raised.

Disable switch 17–3 is opened by reject pin 15Z if a reject signal has lowered the pin 15Z at an earlier station.

Normally closed contacts 88–2 and 89–2 both open when a capacitor section may have a capacity near the division between 0 to +3 percent and the +3 to +6 percent ranges.

In this case, only the 0 to 3 percent pin (yellow) can be lowered as the red contact 89–1 is cut off from the DC source thereby preventing a double reading and a false coding.

AUXILIARY SECTION CAPACITY MEASURING STATION VII

After the main section of a two-section capacitor 2 is tested at station VI, the capacitOr 2 is advanced to an auxiliary section testing station VII. This station includes a capacitor measurement device 94 which is coupled to the auxiliary capacitor section by suitable contacts 95. In the embodiment of the auxiliary section tester illustrated, the auxiliary section is tested to determine whether it comes within an acceptable range as, for example, whether or not its value is between plus or minus 20 percent. The tester 95 at station VII is activated at the desired moment by a cam 30–18 and switch 31–18 in the above described cam timing system 27. In the event that an unacceptable capacitor 2 is detected, a reject contact 96 on the tester 94 closes, thereby closing the relay 97 to activate a memory pin reject solenoid 16–8 and counter 98.

Disable switch 17–4 prevents readings if the reject pin 15Z has previously been lowered at an earlier station.

FIRST COLOR CODING STATION IX

After the capacitors 2 have been subjected to the various tests discussed above and after the capacitors 2 have been discharged at grounded contacts 99 and have passed through the spare station VIII, the capacitors 2 are successively moved to substantially similar color coding stations IX and X. Each of the stations IX and X mounts two paint spray nozzles or guns similar to nozzle 25 (FIG. 4) containing different colored paint. This provides for different colors which are used to mark the capacitors for one of the four value ranges sensed at station VI. Station IX is seen to include two contact switches 17–5 and 17–6 for engaging the color code memory pins 15X and 15Y. As already described, these two memory pins have been set in four different arrangements, i.e., either both up or both down or with one or the other down. At station IX the memory pin contact switches 17–5 and 17–6 engage the memory pins to activate one or the other of the two paint guns through control solenoids 16–9 and 16–10 according to the position of the memory pins 15X and 15Y by means of the circuit illustrated at the right side of the showing of station IX in FIG. 10. For example, for a white code and spray, neither pin 15X nor 15Y will be down so that switches 17–5 and 17–6 will remain closed to energize the white gun control solenoid 16–9. For yellow coding, pin 15Y only will be down leaving switch 17–6 closed and causing switch 17–5 to energize solenoid 16–10 for the yellow gun when timing switch 31–19 is closed by timing cam 30–19.

Additionally, at station IX the reject memory pin 15Z engages a reject switch 17–7 so that all capacitors 2 for which reject signals may have been generated at any of the preceding stations are removed at station IX prior to the above described spray coating operation. The timing cam 30–20 for the reject operation and the timing cam 30–19 for timing the spray operation are set so that the rejection operation preceeds the coding sprays. The reject switch 17–7 controls reject solenoid 16–11 and return solenoid 16–12 for an air motor 100 (FIGS. 1 and 4) and a connected reject arm 101.

SECOND COLOR CODING STATION X

At station X, a disable switch 17–9 is included to cut off the spraying operation in cases where the capacitors 2 have already been unloaded at station IX. If a capacitor 2 remains in the support 10 with the color coding memory pins set for the colors to be applied in this station, i.e., black and red, the pin combination acting on the control switches 17-7 and 17-8 will activate one or the other of the black or red spray guns. Thus, control solenoid 16-11 for black will be energized with pin 15X down and 15Y up and the red control solenoid 16-12 will be energized when pins 15X and 15Y are both down. Timing cam 30-21 and switch 31-21 control the timing of the spray application.

SELECTIVE UNLOADING STATIONS XI AND XII

Two separate unloading stations XI and XII are provided for permitting a selective discharge of the coded capacitors 2. For example, capacitors 2 with two different ranges and corresponding color codes may be unloaded at station XI. This is done by using the color code sensing pins 15X and 15Y to activate the unload motor solenoids 16-13 and 16-14 for unload motor 103 (FIG. 1) only for two of the four possible combinations of the memory pins 15X and 15Y. An arrangement whereby the two control switches 17-10 and 17-11 close the reject circuit for either white or red (i.e. with 15X and 15Y both up or both down) is illustrated in FIG. 10 for station XI. Jumpers 104 and 105 may be adjusted for selecting other color combinations at station XI as the timing cam 30-22 and switch 31-22 close.

Station XII has an unloading air motor 106 (FIG. 1) which is operated for each index of the machine turret under the control of the timing cam 30-23 and switch 31-23 in the cam system 27 so that all capacitors 2 which remain in the machine are removed at this station under the control of advance and retract solenoids 16-15 and 16-16 for motor 106.

It will be seen that an improved high speed automatic capacitor test machine has been provided. The machine is capable of performing a number of differing and adjustable tests including insulation, capacitance value, and di-electric strength tests. In addition to providing these tests, the machine performs a selective marking or color coding operation for identifying the capacitors in accordance with the test results. Additionally, the machine has selective rejection or unloading capabilities so that the capacitors may be selectively and automatically grouped during the unloading in accordance with the test results. All of the above automatic and adjustable functions are provided on a rugged, high speed, reliable machine capable of operating at speeds comparable to those of related capacitor manufacturing devices permitting the test apparatus, if desired, to be made a portion of an automatic capacitor manufacturing operation.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. An improved capacitor test machine comprising the combination of:
   a plurality of spaced capacitor test stations;
   means to move capacitors successively to said stations;
   means at said stations for testing the capacitors for detecting faulty capacitors;
   recording means on said moving means coupled to said detecting means for recording the detection of a faulty capacitor; and
   removal means positioned for activation by said recording means to remove faulty capacitors detected at preceding test stations.

2. The test machine as claimed in claim 1 in which said testing means comprises a voltage test means.

3. The test machine as claimed in claim 2 in which said testing means comprises successive voltage test means with the initial voltage test being for a higher test voltage.

4. The test machine as claimed in claim 1 in which said testing means comprises a capacitance value tester.

5. The test means as claimed in claim 4 in which said capacitance value tester comprises means to register the capacitance value within a plurality of preselected ranges, operatively coupled to said recording means.

6. The test machine as claimed in claim 1 in which said testing means comprises an insulation tester.

7. The test machine as claimed in claim 1 in which said testing means comprises separate voltage, insulation and capacitance value testers all coupled to said recording means.

8. The test machine as claimed in claim 1 which further comprises capacitor coding marking means operatively coupled to said recording means.

9. An improved capacitor test machine comprising the combination of:
   a base;
   a plurality of spaced capacitor test stations on said base;
   a rotatably mounted turret having spaced capacitor supports to move capacitors successively to said stations;
   testing means at a plurality of said stations for detecting faulty capacitors;
   fault recording means on said turret operatively coupled to said detecting means for recording the detection of a faulty capacitor at the test stations;
   first capacitor unloading means positioned for activation by said fault recording means to remove faulty capacitors detected at preceding test stations; and
   second capacitor unloading means for unloading the remaining capacitors.

10. The test machine as claimed in claim 9 in which said testing means comprises a voltage test means.

11. The test machine as claimed in claim 10 in which said testing means comprises successive voltage test means with the initial voltage test being for a higher test voltage.

12. The test machine as claimed in claim 9 in which said testing means comprises a capacitance value tester.

13. The test means as claimed in claim 12 in which said capacitance value tester comprises means to register the capacitance value within a plurality of preselected ranges operatively coupled to said recording means.

14. The test machine as claimed in claim 9 in which said testing means comprises an insulation tester.

15. The test machine as claimed in claim 9 in which said testing means comprises separate voltage, insulation and capacitance value testers all coupled to said recording means.

16. The test machine as claimed in claim 9 which further comprises a plurality of capacitor coding marking means operatively coupled to said recording means.

17. The test machine as claimed in claim 16 in which said marking means comprise spray nozzles.

18. An improved capacitor test machine comprising the combination of:
- a base;
- a plurality of spaced capacitor test stations positioned on said base;
- a rotatably mounted turret having spaced capacitor supports to move capacitors successively to said stations;
- drive means for said turret;
- testing means positioned at a plurality of said stations for detecting faulty capacitors;
- fault recording pins movably mounted on said turret and operatively coupled to said detecting means for recording the detection of a faulty capacitor at the test stations;
- coding marking means positioned for being selectively activated by said fault recording pins for coding the capacitors;
- first capacitor unloading means positioned for being selectively activated by said fault recording pins to remove faulty capacitors detected at preceding test stations; and
- second capacitor unloading means for unloading the remaining capacitors.

19. The test machine as claimed in claim 18 in which said testing means comprises a capacitance value tester including means for providing value readings at said pins corresponding to a plurality of preselected capacitance ranges.

20. The test machine as claimed in claim 19 in which said code marking means comprises a plurality of markers and means for operatively coupling them to said pins whereby a different color code is applied for each of said capacitance ranges.

* * * * *